United States Patent
Post et al.

(10) Patent No.: US 12,355,763 B2
(45) Date of Patent: Jul. 8, 2025

(54) METHODS AND SYSTEMS FOR IDENTIFYING UNAUTHORIZED LOGINS

(71) Applicant: Capital One Services, LLC, McLean, VA (US)

(72) Inventors: Richard Post, Mechanicsville, VA (US); Aurielle Catron, Richmond, VA (US); Danielle Hagerty, Alexandria, VA (US); Jason Haile, Washington, DC (US); Derek Lafever, Henrico, VA (US); Daniel Parker, Spotsylvania, VA (US); Nathan Weilbacher, Sherman, TX (US)

(73) Assignee: Capital One Services, LLC, McLean, VA (US)

( * ) Notice: Subject to any disclaimer, the term of this patent is extended or adjusted under 35 U.S.C. 154(b) by 454 days.

(21) Appl. No.: 17/447,981

(22) Filed: Sep. 17, 2021

(65) Prior Publication Data
US 2023/0089920 A1 Mar. 23, 2023

(51) Int. Cl.
*G06F 7/04* (2006.01)
*G06N 20/00* (2019.01)
*H04L 9/40* (2022.01)

(52) U.S. Cl.
CPC ......... *H04L 63/0876* (2013.01); *G06N 20/00* (2019.01); *H04L 63/126* (2013.01)

(58) Field of Classification Search
CPC ..... H04L 9/0866; H04L 9/3226; H04L 63/10; H04L 63/101; H04L 63/105;
(Continued)

(56) References Cited

U.S. PATENT DOCUMENTS 7,552,865 B2 6/2009 Varadarajan et al.
8,291,468 B1* 10/2012 Chickering ......... H04L 63/0884
709/227

(Continued)

FOREIGN PATENT DOCUMENTS

CN 108596434 B 8/2019

OTHER PUBLICATIONS

Anani et al, The Importance of Human Dynamics in the Future User Authentication, May 3, 2017, IEEE, pp. 1-5. (Year: 2017).*

(Continued)

*Primary Examiner* — Philip J Chea
*Assistant Examiner* — Jenise E Jackson
(74) *Attorney, Agent, or Firm* — Bookoff McAndrews, PLLC

(57) ABSTRACT

A computer-implemented method of identifying unauthorized logins may include: receiving a login request from a user device; using a machine learning model, generating a score corresponding to the login request, the machine learning model being trained to learn associations between identification data associated with login requests and scores based at least on (i) a set of prior login requests and (ii) a set of login classifications, each of the set of login classifications corresponding to at least one of the set of prior login requests; determining whether the score exceeds a predetermined score threshold; and in response to a determination that the score exceeds the predetermined score threshold, rejecting the login request and prompting a user of the user device to submit a renewed login request.

20 Claims, 6 Drawing Sheets

(58) Field of Classification Search
CPC . H04L 63/102; H04L 63/0876; H04L 63/126; G06F 21/31; G06F 21/316; G06F 21/552; G06N 20/00
See application file for complete search history.

(56) References Cited

U.S. PATENT DOCUMENTS

| | | | |
|---|---|---|---|
| 8,973,096 | B1 | 3/2015 | Villa et al. |
| 9,210,147 | B1* | 12/2015 | Zilberberg .............. H04L 63/08 |
| 9,516,035 | B1 | 12/2016 | Moritz et al. |
| 10,924,479 | B2* | 2/2021 | Jain .................... H04L 63/0861 |
| 10,951,476 | B1* | 3/2021 | Wuehler ................ H04L 67/34 |
| 11,356,472 | B1* | 6/2022 | Maiorana ............. H04L 63/107 |
| 11,641,368 | B1* | 5/2023 | Shah ................... H04L 63/1433 726/6 |
| 2008/0162338 | A1 | 7/2008 | Samuels et al. |
| 2016/0283715 | A1 | 9/2016 | Duke et al. |
| 2016/0306965 | A1* | 10/2016 | Iyer ................... G06Q 10/0635 |
| 2017/0346817 | A1* | 11/2017 | Gordon ................. G06V 40/10 |
| 2019/0064752 | A1* | 2/2019 | Marwah ................. H04L 63/08 |
| 2019/0190962 | A1 | 6/2019 | Atham et al. |
| 2019/0205511 | A1 | 7/2019 | Zhan et al. |
| 2019/0295088 | A1 | 9/2019 | Jia et al. |
| 2019/0295090 | A1 | 9/2019 | Vandezande et al. |
| 2019/0349351 | A1* | 11/2019 | Verma .................... H04L 63/30 |
| 2019/0387007 | A1 | 12/2019 | Muddu et al. |
| 2020/0143037 | A1* | 5/2020 | Sunkavally ............. H04L 63/20 |
| 2020/0184048 | A1* | 6/2020 | Toth ........................ G06N 20/00 |
| 2020/0244709 | A1* | 7/2020 | Latham ............... H04L 63/1425 |
| 2020/0293638 | A1 | 9/2020 | Rose et al. |
| 2021/0051176 | A1* | 2/2021 | Stolfo ................. H04L 63/1491 |
| 2021/0090816 | A1* | 3/2021 | Ibrahim ................. G06N 20/00 |
| 2021/0157945 | A1 | 5/2021 | Cobb et al. |
| 2021/0203651 | A1* | 7/2021 | Basson ................. G06F 21/556 |
| 2021/0344659 | A1* | 11/2021 | Bloom .............. G06Q 20/1085 |
| 2023/0040231 | A1* | 2/2023 | Burgess ................. G06N 20/20 |

OTHER PUBLICATIONS

Bakar et al, Adaptive Authentication based on Analysis of User Behavior, Aug. 29, 2014, IEEE, pp. 601-606. (Year: 2014).*
International Search Report and Written Opinion in Application No. PCT/US2022/076450, dated Nov. 11, 2022 (12 pages).

* cited by examiner

METHODS AND SYSTEMS FOR IDENTIFYING UNAUTHORIZED LOGINS

TECHNICAL FIELD

Various embodiments of the present disclosure relate generally to identifying unauthorized logins, and more specifically to systems and methods for identifying unauthorized logins using scoring and/or a machine learning model.

BACKGROUND

In an increasingly connected environment, entities providing products and services may make their products and services available to users anywhere the user has access to an internet connection. Depending on the entity, products and services may be made available to users via a webpage on the internet, via an application, or otherwise via a connected device. To provide personalized products and services to the user, the entity may maintain an account associated with the user into which the user may sign in. The user may sign into the account with a username and password or PIN, for example.

For any number of reasons, a user's login credentials may become compromised. Should login credentials become compromised, a bad actor may be able to log into the user's account and steal sensitive information, engage in unauthorized transactions, or engage in other unauthorized activity.

The present disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods for identifying unauthorized logins are described.

In one example, a computer-implemented method for identifying unauthorized logins may include: receiving a login request from a user device, the login request including one or more login identification data; using a machine learning model, generating a score corresponding to the login request based on at least one of the one or more login identification data, the machine learning model being trained to learn associations between identification data associated with login requests and scores based at least on (i) a set of prior login requests and (ii) a set of login classifications, each of the set of login classifications corresponding to at least one of the set of prior login requests; determining whether the score exceeds a predetermined score threshold; and in response to a determination that the score exceeds the predetermined score threshold, rejecting the login request and prompting a user of the user device to submit a renewed login request.

In another example, a computer-implemented method for training a machine learning model to identify unauthorized logins may include: training the machine learning model to learn associations between login requests and scores using at least (i) a set of prior login requests and (ii) a set of classifications, each of the set of classifications corresponding to at least one of the set of prior login requests; receiving a login request from a user device, the login request including one or more login identification data; generating, using the machine learning model, a score corresponding to the login request based on at least one of the one or more login identification data; displaying, on an agent device, an indication of the login request; receiving, via the agent device, a classification of the login request; and updating the machine learning model based on the classification of the login request.

In a further example, a system for identifying one or more unauthorized logins may include: an agent device; one or more memories storing instructions and a machine learning model trained to learn associations between login requests and scores based at least on (i) a set of login requests and (ii) a set of classifications, each of the set of classifications corresponding to one of the set of login requests; and one or more processors operatively connected to the one or more memories. The one or more processors may be configured to execute the instructions to: receive a login request from a user device, the login request including one or more login identification data; generate a score corresponding to the login request based on at least one of the one or more login identification data, the score being indicative of a likelihood that the login request is unauthorized; associate the one or more login identification data with the score; determine whether the score exceeds a predetermined score threshold; in response to a determination that the score exceeds the predetermined score threshold, cause the login request to be rejected and a user of the user device to be prompted to submit a renewed login request; in response to a determination that the score does not exceed the predetermined score threshold, cause the login request to be processed and the user device to be granted access to a secure resource; receive a search query from the agent device, the search query including at least one of the one or more login identification data; and in response to receiving the search query, cause an indication of the score to be displayed on the agent device.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
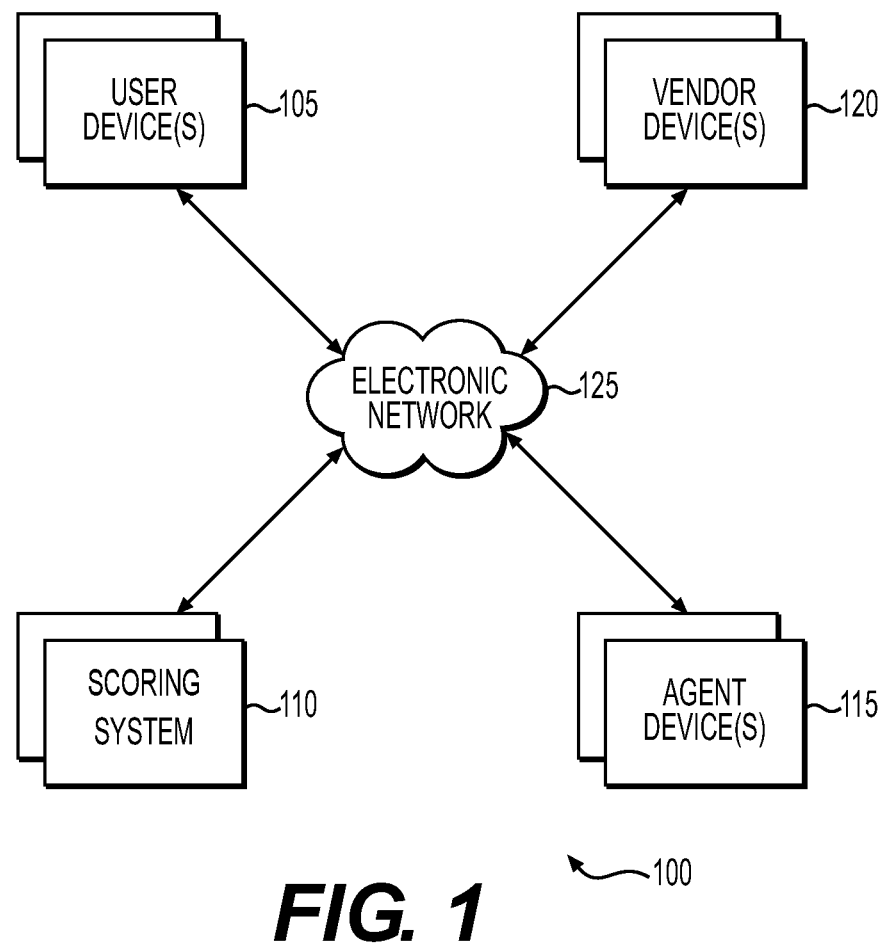
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The term "unauthorized" or the like, as used herein, generally describes a lack of permission or approval by a relevant entity. For example, an unauthorized login with a user's credentials may encompass a login for which the user has not provided permission or approval. The term "unauthorized" or the like, as used herein, may further encompass fraud or fraudulent activity.

In general, the present disclosure is generally directed to systems and methods for identifying unauthorized logins, and more specifically to systems and methods for identifying unauthorized logins using scoring and/or a machine learning model. The methods and systems according to the present disclosure offer significant technical benefits which will become apparent.

As use of connected devices continues to increase, an entity may make its products and services available to consumers or users in various ways. For example, a user of digital products or digital services may be able to access such products or services whenever and wherever an internet connection is available. The user may further be able to access such products or devices using any of various connected devices, such as a mobile phone, a tablet, a personal computer, or any other connected device. Depending on the entity or products or services provided, the user may access the products or services via a webpage on the internet or via an application, for example.

In many cases, an entity providing products and services may maintain an account associated with the user, which the user may access by logging in. The entity may maintain an account associated with the user in order to offer personalized products or services to the user, or otherwise maintain sensitive information associated with the user. Examples of entities maintaining such accounts may include healthcare providers, financial services providers, merchants, or government entities. To sign into the account, the user may be prompted to enter a set of credentials, such as a username and password or a username and personal identification number (PIN).

If a user's credentials remain known only to the user and the entity maintaining the user's account, the account may be relatively secure from unauthorized access. A user's credentials may become compromised, however, due to any number of reasons, including due to theft or due to a data breach. Once a user's credentials have become compromised, bad actors may be able to gain access to the user's sensitive information or assets relatively easily. A bad actor may, for example, log in to the user's account on a connected device in an unauthorized manner simply by entering the user's credentials when requested by the entity. The bad actor may do so anywhere an internet connection is available, making such logins difficult to police. Moreover, if the bad actor is able to successfully login and exploit the user's sensitive information or assets, it may be difficult, if not impossible, to provide a remedy for the user.

Accordingly, a need exists to address the foregoing challenges. Particularly, a need exists to identify unauthorized logins in real time. Embodiments of the present disclosure offer technical solutions to address the foregoing needs, as well as other needs.

In an exemplary use case, a user's login credentials for an account maintained by an entity providing products or services may be compromised. A bad actor may obtain the user's login credentials and attempt to log into the user's account with the login credentials using a connected device.

The bad actor may use the connected device to transmit a login request to the entity. Upon receipt by the entity, the login request may be routed to a scoring system. The login request may include various login identification data, such as a username, a password, a PIN, a device ID, an ISP identifier, an IP address, or a user agent identifier. A device ID may be an identifier associated with a user device. An ISP identifier may be an identifier associated with an internet service provider. An IP address may be an identifier associated with a connected device. A user agent identifier may be an identifier associated with a software agent acting on behalf of a user, such as a web browser or an application. Based on one or more of the login identification, the scoring system may generate a score associated with the login request. The scoring system may further classify the login request based on the score.

Based on the classification of the login request, the scoring system may take any of several actions. If the scoring system classifies the login request as having a high score, the scoring system may enter the login credentials into a fix up flow. The scoring system may further redirect the connected device to a renewed login page and request multi-factor authentication. The scoring system may further refer the login request for investigation. If the bad actor is unable to satisfy the multi-factor authentication, the bad actor may be prohibited from logging into the user's account and the attempted unauthorized activity may be thwarted.

In another exemplary use case, a user's login credentials for an account maintained by an entity providing products or services may not be compromised. The user may attempt to log into their account in a normal, authorized manner using the login credentials.

The user may use a user device to transmit a login request to the entity. Upon receipt by the entity, the login request may be routed to a scoring system. The login request may include various login identification data, such as a username, a password, a PIN, a device ID, an ISP identifier, an IP address, or a user agent identifier. Based on one or more of the login identification, the scoring system may generate a score associated with the login request. The scoring system may further classify the login request based on the score.

Based on the classification of the login request, the scoring system may take any of several actions. If the scoring system classifies the login request as having a low score or as being of no risk, the scoring system may process the login request and allow the login.

FIG. 1 depicts an exemplary computing environment 100 that may be utilized with techniques presented herein. One or more user device(s) 105, a scoring system 110, one or more agent device(s) 115, and one or more vendor device(s) 120 may communicate across an electronic network 125. The user device 105 may be associated with, and used by, a user. The systems and devices of the computing environment 100 may communicate in any arrangement. As will be discussed herein, systems and/or devices of the computing environment 100 may communicate in order to identify one or more unauthorized logins.

The user device 105 may be a computer system such as, for example, a desktop computer, a mobile device, etc. In an exemplary embodiment, the user device 105 may be a cellphone, a tablet, or the like. In some embodiments, the user device 105 may include one or more electronic application(s), e.g., a program, plugin, browser extension, etc., installed on a memory of the user device 105. In some embodiments, the electronic application(s) may be associated with one or more of the other components in the computing environment 100. For example, the electronic application(s) may include a web browser, another application, or the like configured to allow access to products or services offered by an entity. The user device 105 may be configured to transmit login requests to access products or services offered by an entity.

The scoring system 110 may be a computer system which may receive login requests, such as a login request transmitted by the user device 105. In some embodiments, the scoring system 110 may be configured to generate a score associated with a login request. The scoring system 110 may generate the score based on login identification data associated with a login request. In some embodiments, the scoring system 110 may be further configured to classify the login request based on the score. In some embodiments, the scoring system 110 may be configured to take certain actions based on the classification, including processing the login request, rerouting the user device 105 to a login page and requiring multi-factor authentication, or referring the login request for investigation. In some embodiments, the scoring system 110 may include a machine learning model for generating a score. In some embodiments, the scoring system 110 may receive and store data used to train the machine learning model.

The agent device 115 may be a computer system such as, for example, a desktop computer, a mobile device, etc. The agent device 115 may provide a platform via which an agent may analyze login requests. The agent may be, for example, an employee of an entity offering products or services tasked with monitoring and/or analyzing login requests. The agent may also be, for example, tasked with investigating potential instances of unauthorized activity involving user accounts maintained by the entity. The agent device 115 may further allow the agent to interact with the scoring system 110. For example, the agent device 115 may allow the agent to input data used to train the machine learning model of the scoring system 110. The agent device 115 may further allow the agent to perform searches of data stored by the scoring system 110.

The vendor device 120 may be a computer system which may store and/or transmit data to the scoring system 110 and/or the agent device 115. The vendor device 120 may be maintained by a vendor such as an internet activity intelligence entity. The vendor may aggregate data associated with known or suspected instances of unauthorized activity. The vendor device 120 may transmit the data associated with known or suspected instances of unauthorized activity to the scoring system 110 to be used to train the machine learning model. The vendor device 120 may also transmit the data associated with known or suspected instances of unauthorized activity to the agent device 115 for use or analysis by an agent.

In various embodiments, the electronic network 125 may be a wide area network ("WAN"), a local area network ("LAN"), personal area network ("PAN"), or the like. In some embodiments, electronic network 125 may be a secured network. In some embodiments, the secured network may be protected by any of various encryption techniques. In some embodiments, electronic network 125 may include the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

Although depicted as separate components in FIG. 1, it should be understood that a component or portion of a component may, in some embodiments, be integrated with or incorporated into one or more other components. For example, a portion of the scoring system 110 may be provided to the agent device 115 as an electronic portal via an electronic application. Any suitable arrangement of the various systems and devices of the computing environment 100 may be used.

In the methods below, various acts are described as performed or executed by one or more components shown in FIG. 1, such as user device 105, scoring system 110, agent device 115, or vendor device 120. However, it should be understood that in various embodiments, various components or combinations of components of the computing environment 100 discussed above may execute instructions or perform acts including the acts discussed below. Further, it should be understood that in various embodiments, various steps may be added, omitted, and/or rearranged in any suitable manner.

Figure 2:
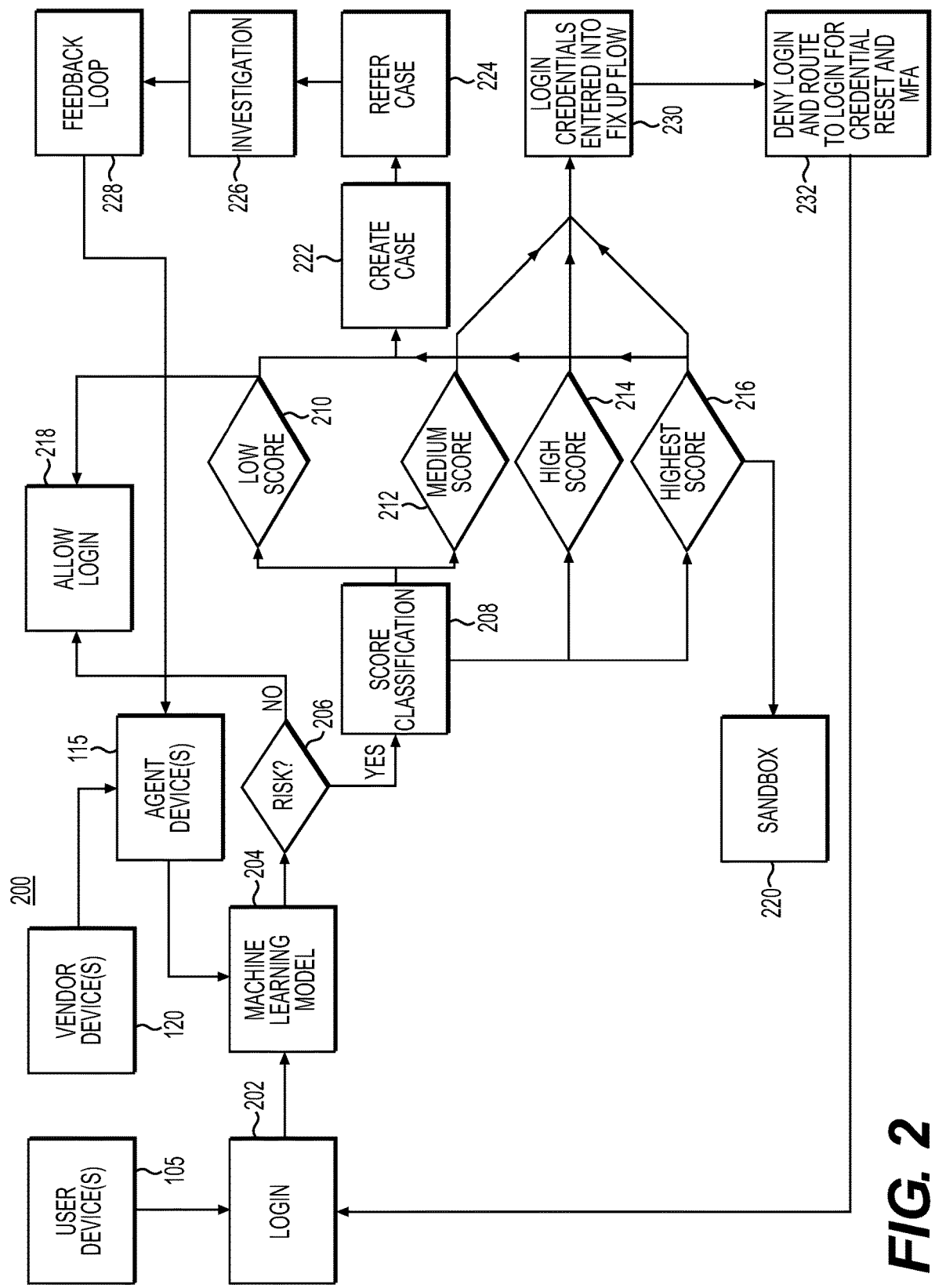
FIG. 2 depicts an exemplary process flow, according to one or more embodiments.

FIG. 2 depicts an exemplary process flow 200, according to one or more embodiments. It is to be understood that the process flow 200 may include fewer than all steps or elements shown in FIG. 2 or may alternatively include additional steps or elements not shown in FIG. 2.

As shown in FIG. 2, a user device 105 may navigate to a login 202. The login 202 may be a login portal whereby a user of the user device 105 may be prompted to submit a request (login request) to log into an account maintained by an entity. At login 202, the user may enter login credentials for the account and the user device 105 may transmit a login request to the entity. The login request may include login identification data associated with the login request, such as a username, a password, a device ID, an ISP (internet service provider) identifier, an IP address, a user agent identifier, or other login identification data.

The login request transmitted by the user device 105 may be received by the scoring system 110 (e.g., at machine learning model 204), as described above with respect to FIG. 1. Following receipt of the login request by the scoring system 110, machine learning model 204 may generate a score associated with the login request. The machine learning model 204 may generate the score based on one or more of the login identification data associated with the login request. For example, the machine learning model 204 may be trained to associate one or more of the login identification data with a score. A method for training the machine learning model 204 will be described in greater detail hereinafter with respect to FIG. 4.

At 206, the scoring system 110 may determine, based on the score, whether there is a risk of unauthorized activity associated with the login request. For example, if the score exceeds a predetermined score threshold, the scoring system 110 may determine that there is a risk of unauthorized activity associated with the login request. The scoring system 110 may then perform score classification at 208. If, on the other hand, the score does not exceed the predetermined score threshold, the scoring system 110 may determine that there is not a risk of unauthorized activity associated with the login request. The scoring system 110 may then proceed to process the login request and allow the user to login at 218.

If the scoring system 110 performs score classification at 208, the scoring system 110 may classify the login request according to one of several classifications. For example, if the score is less than a first classification threshold, the scoring system 110 may classify the login request as having a low score 210. If the score exceeds the first classification threshold and is less than a second classification threshold, the scoring system 110 may classify the login request as having a medium score 212. If the score exceeds the second classification threshold and is less than a third classification threshold, the scoring system 110 may classify the login request as having a high score 214. If the score exceeds the third classification threshold the scoring system 110 may classify the login request as having a highest score 216. In the example described herein previously, the third classification threshold may be greater than the second classification threshold, which may be greater than the first classification threshold.

In the event the scoring system 110 classifies the login request as having a low score 210, the scoring system 110 may then proceed to process the login request and allow the user to login at 218. The scoring system 110 may further create a case at 222 corresponding to the login request. The case may be an electronic record corresponding to the login request and containing data associated with the login request that is stored by the scoring system 110.

In the event the scoring system 110 classifies the login request as having a medium score 212, a high score 214, or a highest score 216, the login request may be entered into a fix up flow at 230. The scoring system 110 may further create a case at 222 corresponding to the login request.

In the event the scoring system 110 classifies the login request as having a highest score 216, the login request may be referred to sandbox 220. Sandbox 220 may be an element of the scoring system 110 which tracks and records suspicious activity. For example, sandbox 220 may track and record activity corresponding to one or more of the login identification data, such as an IP address or device ID, associated with the login request to gather intelligence about potential unauthorized behavior.

If the login request is classified as having a medium score 212, a high score 214, or a highest score 216 and is entered into the fix up flow at 230, at 232 the login request may be denied and the user device 105 may be rerouted to login 202. At login 202, the user of the user device 105 may be prompted to reset their credentials, such as a username, password, and/or PIN. The user may be further prompted to complete a multi-factor authentication (MFA) process. The MFA process may include a one-time passcode process, a biometric authentication process, or any other type of MFA process.

If, for the login request, a case is created at 222, the case may further be referred at 224 to an appropriate individual or department within the entity. For example, the case may be referred based on login identification data associated with the login request. The case may then be submitted for investigation 226. Investigation 226 may involve any known technique for studying activity and/or identifying unauthorized activity. As a result of the investigation 226, the case may be flagged with a conclusion of the investigation. For example, if the investigation 226 results in a determination that a case and/or an associated login request is confirmed to be unauthorized activity, the case and/or associated login request may be flagged accordingly. If, on the other hand, the investigation 226 results in a determination that a case and/or an associated login request is confirmed as authorized activity, the case and/or associated login request may be flagged as confirmed authorized activity.

The case and/or associated login request may then enter feedback loop 228 via which it is provided to the agent device 115. The agent device 115 may receive the case and display an indication of whether it was flagged as confirmed unauthorized activity or confirmed authorized activity. The agent device 115 may further input the case and/or associated login request, including any associated flags, as data for training the machine learning model 204. In some embodiments, the case and/or associated login request, including any associated flags, may be automatically input to the machine learning model 204 from the feedback loop 228, without first being provided to the agent device 115.

In addition to receiving cases and/or flagged login requests via the feedback loop 228, the agent device 115 may further receive vendor data from the vendor device 120. The vendor data may comprise data associated with unauthorized activity identified and/or collected by, for example, an internet activity intelligence entity. The set of vendor data may further include a set of vendor classifications associated with one or more of the vendor data and corresponding to a likelihood that the one or more vendor data is representative of unauthorized activity. For example, if a particular device ID or IP address is known to be associated with unauthorized activity, the device ID or IP address may be associated with a classification indicative of a high likelihood of unauthorized activity. The agent device 115 may further input the vendor data and/or the vendor classifications into the machine learning model 204 to be used to train the machine learning model 204. In some embodiments, the vendor data and/or the vendor classifications may be input directly to the machine learning model 204 from the feedback loop 228, without first being provided to the agent device 115.

Figure 3:
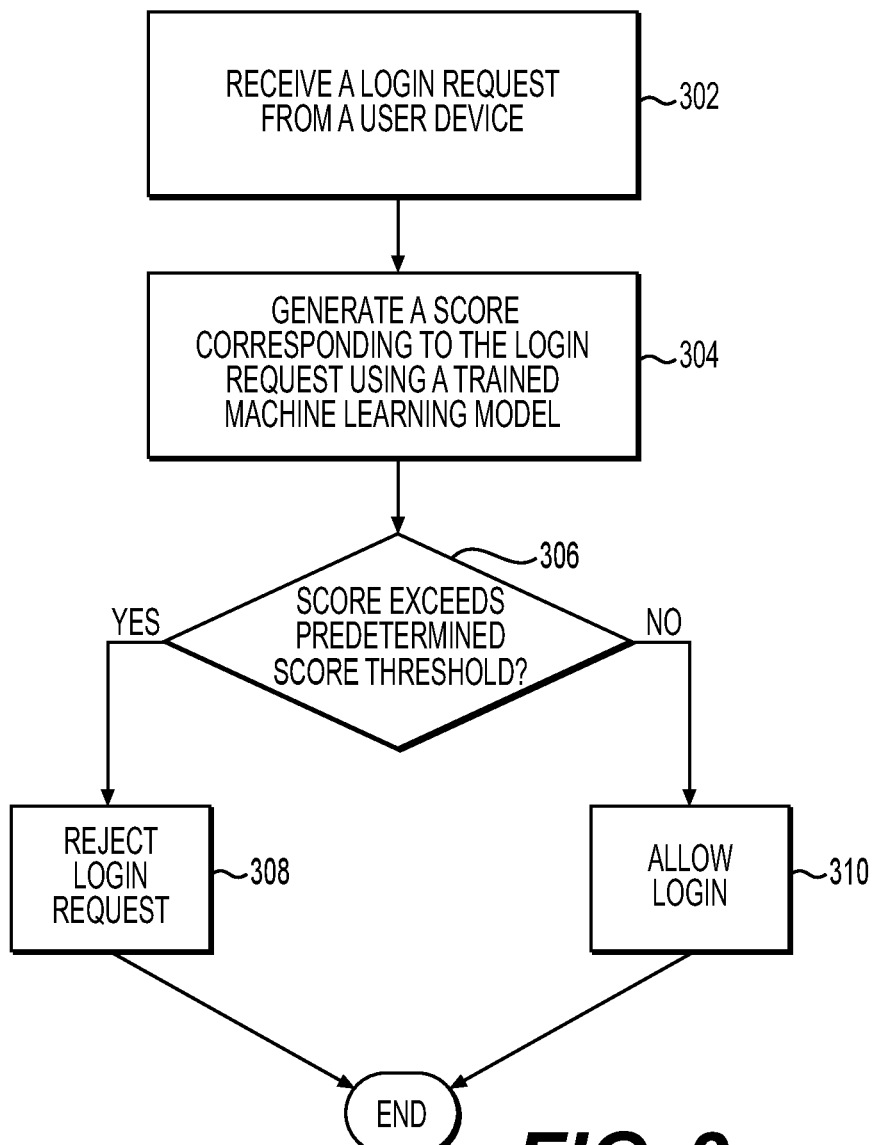
FIG. 3 depicts a flowchart of an exemplary method of detecting unauthorized logins, according to one or more embodiments.

FIG. 3 illustrates an exemplary process 300 for detecting unauthorized logins which may use components described herein previously with respect to FIGS. 1 and 2.

At step 302, a scoring system 110 may receive a login request from a user device 105. The login request may be generated by the user device 105 in response to a user navigating to a login prompt on the user device 105 and entering login credentials. For example, the user may navigate to a webpage of a financial services entity using a browser of the user device 105 and may be prompted to submit credentials for an account maintained by the financial services entity. The login request may include the credentials and other login identification data associated with the login request, including a username, a password, a PIN, a device ID, an ISP identifier, an IP address, or a user agent identifier.

At step 304, the scoring system 110 may generate a score corresponding to the login request. The scoring system 110 may generate the score based on one or more of the login identification data associated with the login request. The scoring system 110 may further generate the score using a trained machine learning model (e.g., machine learning model 204). In some embodiments, the machine learning model 204 may be trained to associate one or more of the login identification data with a likelihood of unauthorized activity. For example, if a username associated with the login request has been associated with confirmed unauthorized activity in the past and that information has been input to the machine learning model 204 for training, the machine learning model 204 may generate a score commensurate with an increased likelihood that the login request is associated with unauthorized activity.

At step 306, the scoring system 110 may determine whether the score generated at step 304 exceeds a predetermined score threshold. In the event that the score does exceed the predetermined score threshold, thereby indicating an increased likelihood that the login request may be unauthorized, the scoring system 110 may reject the login request at step 308. As described herein previously with reference to FIG. 2, the scoring system 110 may further generate a case corresponding to the login request and flag the case for investigation. The scoring system 110 may further redirect the user device 105 to a login prompt to resubmit the user's credentials, reset the user's credentials, and/or complete a multi-factor authentication process. The multi-factor authentication process may be any form of multi-factor authentication and may involve authentication using something the user knows, something the user is, and/or somewhere the user is.

In the event that the score does not exceed the predetermined score threshold, thereby indicating a low likelihood that the login request is unauthorized, the scoring system 110 may process the login request at step 310 and allow the user to access secured information and/or resources within the account.

The process 300 may therefore allow for identification of unauthorized login requests in real time as they are received. The machine learning model 204 may be used to filter unauthorized login requests from authorized login requests. Thereby, authorized users may be protected from attacks or unauthorized activity without a substantial impact to their login experience.

It is to be understood that process 300 need not necessarily be performed in the exact order described herein and the steps described herein may be rearranged in some embodiments. Further, in some embodiments fewer than all steps of process 300 may be performed and in some embodiments additional steps may be performed.

Figure 4:
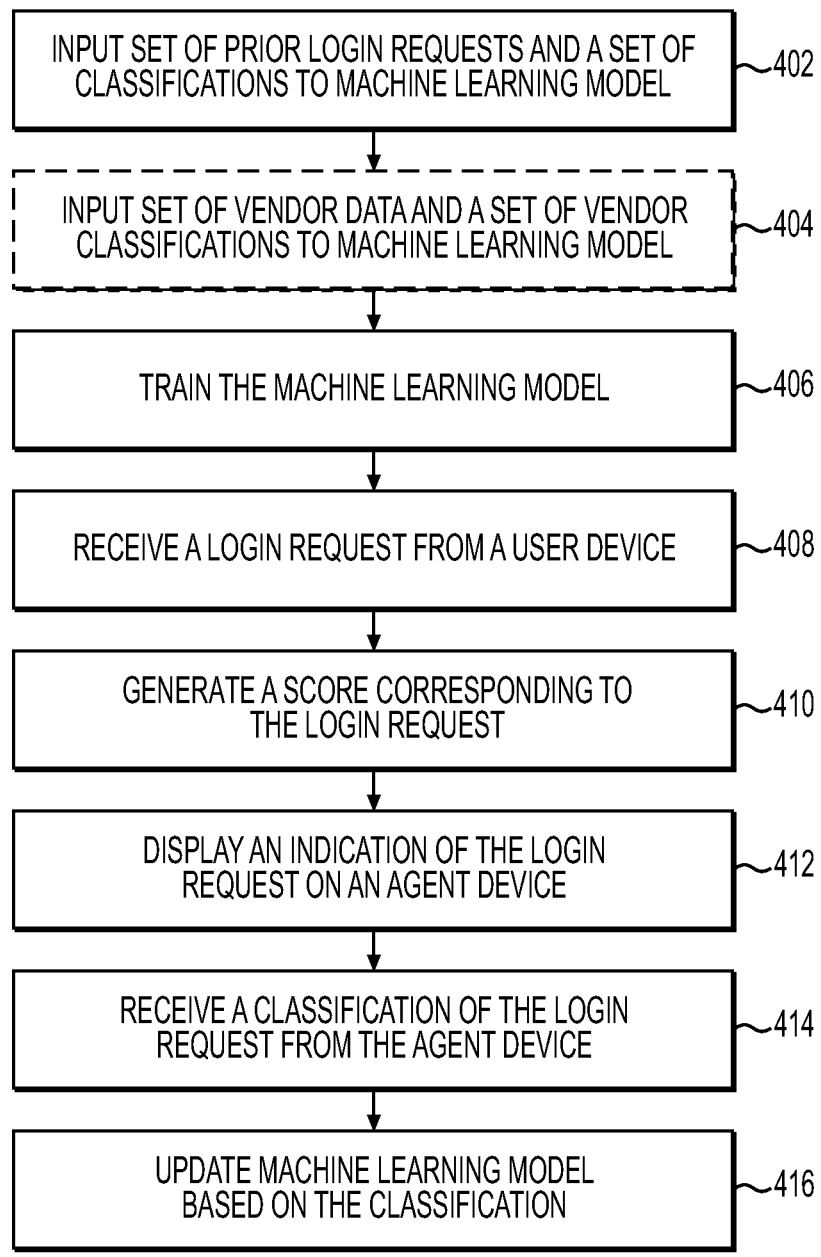
FIG. 4 depicts a flowchart of an exemplary method of training a machine learning model, according to one or more embodiments.

FIG. 4 illustrates an exemplary process 400 for training a machine learning model (e.g., machine learning model 204) which may use components described herein previously with respect to FIGS. 1 and 2.

At step 402, a set of prior login requests and a set of classifications may be input to a machine learning model 204 of the scoring system 110. The set of prior login requests may be a set of historical login requests received by an entity and stored by the scoring system 110. For example, each prior login request may correspond to an attempt by a user to login to an account. The set of prior login requests may include login identification data associated with each of the prior login requests. The login identification data may include one or more of a username, a password, a PIN, a device ID, an ISP identifier, an IP address, or a user agent identifier. In some embodiments, the set of prior login requests may further include a timestamp associated with each of the prior login requests. The timestamp may indicate a date and time at which each prior login request was received.

The set of classifications may include a classification associated with each of the prior login requests. Each of the prior login requests, and/or activity associated with the prior login requests, may have been reviewed or analyzed by an agent or a team who assigned a corresponding classification to each of the prior login requests. For example, an agent may conclude upon analyzing a particular prior login request that it is unauthorized. The agent may thereafter assign a classification to the prior login request indicating that the prior login request is unauthorized. The classification may include a classification score, or may alternatively include a flag indicating whether the prior login request is authorized or unauthorized.

In some embodiments, at step 404, a set of vendor data and a set of vendor classifications may be input to a machine learning model 204 of the scoring system 110. The set of vendor data may comprise data associated with unauthorized activity identified and/or collected by, for example, an internet activity intelligence entity. The set of vendor data may include one or more of a username, a password, a PIN, a device ID, an ISP identifier, an IP address, a user agent identifier, or a timestamp that has been associated with unauthorized activity.

The set of vendor classifications may include one or more classifications associated with each of the set of vendor data. A vendor may assign a vendor classification to each of the vendor data indicating that it is unauthorized. The vendor classification may include a classification score. The vendor classification may further include an identification of the type of unauthorized activity associated with particular vendor data. For example, if the vendor data includes data associated with instances of unauthorized activity relating to banking or financial services, a corresponding vendor classification may so indicate. Similarly, if the vendor data includes data associated with instances of unauthorized activity relating to healthcare or health insurance, a corresponding vendor classification may so indicate.

At step 406, the machine learning model 204 of the scoring system 110 may be trained based on the set of prior login requests and the set of classifications. For example, the machine learning model 204 may be trained to learn associations between login requests and scores using the set of prior login requests and set of classifications. The machine learning model 204 may do so, in part, by associating one or more login identification data corresponding to each of the set of prior login requests with the classifications. For example, if among the set of prior login requests, two or more of the prior login requests classified as unauthorized share common login identification data, such as a device ID, the common device ID may indicate that the two or more of the prior login requests were transmitted by the same device. Based on the set of prior login requests and the set of classifications, therefore, the machine learning model 204 may learn to associate login requests from the particular device ID with a higher score, indicating a higher probability of unauthorized activity. In some embodiments, the machine learning model 204 may be further trained, based on timestamps associated with each of the prior login requests, to generate a projection of unauthorized login requests over time. The projection may indicate times of day, month, and/or year in which unauthorized logins are more likely to occur.

Additionally, the machine learning model 204 of the scoring system 110 may be trained based on the vendor data and the set of vendor classifications. For example, the machine learning model 204 may be trained to learn associations between elements of the vendor data and scores using the vendor data and set of vendor classifications. The machine learning model 204 may do so, in part, by associating one or more login identification data corresponding to each of the vendor data with the vendor classifications.

At step 408, following training of the machine learning model 204, the scoring system 110 may receive a login request from a user device 105. The login request may be generated by the user device 105 in response to a user navigating to a login prompt on the user device 105 and entering login credentials. For example, the user may navigate to a webpage of a financial services entity using a browser of the user device 105 and may be prompted to submit credentials for an account maintained by the financial services entity. The login request may include login identification data associated with the login request, such as a username, a password, a PIN, a device ID, an ISP identifier, an IP address, or a user agent identifier.

At step 410, the scoring system 110 may generate a score corresponding to the login request. The scoring system 110 may generate the score based on one or more of the login identification data associated with the login request. The scoring system 110 may further generate the score using the trained machine learning model 204.

At step 412, the scoring system 110 may cause an indication of the login request to be displayed on an agent device 115. The indication of the login request may include, for example, one or more of the login identification data associated with the login request. For example, if the login request is received from a user device 105 having a particular device ID and IP address, the indication of the login request may include the particular device ID and/or IP address. The indication may be displayed on the agent device 115 for an agent using the agent device 115. The agent may be, for example, an employee of an entity to which the login request was transmitted. The agent may be an employee tasked with monitoring unauthorized activity on the entity's systems.

At step 414, the scoring system 110 may receive a classification of the login request from the agent device 115. The classification may be provided by the agent using the agent device 115 and may be indicative of whether the login request is unauthorized. For example, the agent may examine the login request and/or the login identification data associated with the login request at the agent device 115 and make a determination as to whether the login request is unauthorized. The agent may do so by cross referencing other available data. If the agent determines that the login request is unauthorized, the agent may cause the agent device 115 to transmit a classification indicative of unauthorized activity to the scoring system 110.

At step 416, the trained machine learning model 204 may be updated using the login request and its corresponding classification. For example, the machine learning model 204 may use the login request and/or the associated login identification data and the classification to revise the associations it has learned between login requests and scores. For example, prior to receiving the login request and the classification, the machine learning model 204 may not have associated the particular device ID or IP address with a high score, e.g., a high likelihood of unauthorized activity. However, if the particular device ID or IP address are associated with the login request and the classification assigned by the agent is indicative of unauthorized activity, the machine learning model 204 may be updated to associate the particular device ID and/or IP address with a high likelihood of unauthorized activity. In this way, the machine learning model 204 may be continuously updated using feedback from agents using the agent device 115.

It is to be understood that process 400 need not necessarily be performed in the exact order described herein and the steps described herein may be rearranged in some embodiments. Further, in some embodiments fewer than all steps of process 400 may be performed and in some embodiments additional steps may be performed.

Figure 5:
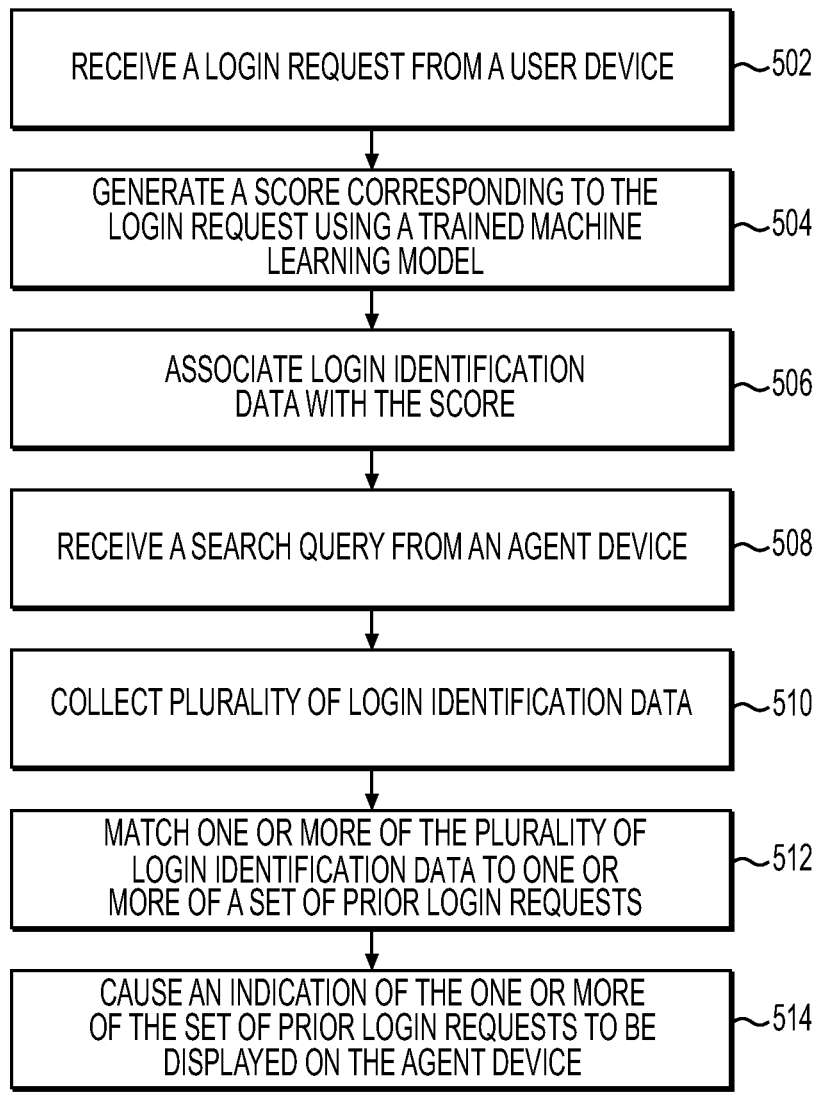
FIG. 5 depicts a flowchart of an exemplary method of searching login identification data, according to one or more embodiments.

FIG. 5 illustrates an exemplary process 500 for searching login identification data, which may use components described herein previously with respect to FIGS. 1 and 2.

At step 502, the scoring system 110 may receive a login request from a user device 105. The login request may be generated by the user device 105 in response to a user navigating to a login prompt on the user device 105 and entering login credentials. The login request may include login identification data associated with the login request, such as a username, a password, a PIN, a device ID, an ISP identifier, an IP address, a user agent identifier, or a timestamp.

At step 504, the scoring system 110 may generate a score corresponding to the login request. The scoring system 110 may generate the score based on one or more of the login identification data associated with the login request. The scoring system 110 may further generate the score using a trained machine learning model (e.g., machine learning model 204). In some embodiments, the machine learning model 204 may be trained to associate one or more of the login identification with a likelihood of unauthorized activity. The trained machine learning model 204 may be trained as described herein previously with respect to FIG. 4.

At step 506, the scoring system 110 may associate each of the login identification data with the score. For example, if the login identification data includes a username, the scoring system 110 may associate the username with the score. Likewise, if the login identification data includes a device ID, the scoring system 110 may associate the device ID with the score. The scoring system 110 may further associate any of the other login identification data with the score.

At step 508, the scoring system 110 may receive a search query from an agent device 115. The search query may be submitted, for example, by an agent using the agent device 115. The search query may further be submitted via a search dashboard displayed on the agent device 115. The search query may include one or more of the login identification data associated with the login request. For example, an agent using the agent device 115 may receive a notification of the login request and may wish to perform a search of data maintained by the scoring system 110 for information relevant to the login request. The agent may therefore select one or more of the login identification data associated with the login request and submit it to the agent device 115 as a search query. The agent device 115 may then transmit the search query to the scoring system 110.

At step 510, the scoring system 110 may collect a plurality of login identification data associated with the login request. The plurality of login identification data may include any login identification not submitted with the search query. For example, login identification data for a login request may include all of a username, a password, a PIN, a device ID, an ISP identifier, an IP address, or a user agent identifier. If the scoring system 110 receives the PIN with the search query, the scoring system 110 may then collect the remaining login identification data, which may include the username, password, device ID, ISP identifier, IP address, or user agent identifier.

At step 512, the scoring system 110 may match one or more of the plurality of login identification data to one or more of a set of prior login requests. To perform the matching, the scoring system 110 may search a database of prior login requests to determine whether any of the set of prior login requests share common login identification data with the plurality of login identification data collected in step 510. The scoring system 110 may identify any prior login requests that share common login identification data with the plurality of login identification data collected in step 510.

At step 514, if the scoring system 110 identifies any prior login requests that share common login identification data with the plurality of login identification data collected in step 510, the scoring system 110 may cause an indication of one or more such prior login requests to be displayed on the agent device 115. The indication may further include information about whether any such prior login requests were determined to be unauthorized or otherwise associated with unauthorized activity. The indication may further include a score generated for any such prior login request. Some embodiments may therefore be used to provide an agent using the agent device 115 with information about a login request including information about any similar prior login requests. The agent may thereby be empowered to make judgments about the login request based on past data and alert relevant parties as necessary.

It is to be understood that process 500 need not necessarily be performed in the exact order described herein and the steps described herein may be rearranged in some embodiments. Further, in some embodiments fewer than all steps of process 500 may be performed and in some embodiments additional steps may be performed.

In light of the foregoing description, several aspects of the embodiments are apparent. Some embodiments may leverage a machine learning model to identify unauthorized login requests in real time as they are received. By identifying the unauthorized login requests in real time, the unauthorized login requests may be segregated from the ordinary login flow and remedial steps may be taken. Some embodiments may therefore prohibit and further discourage unauthorized login attempts. Further, in some embodiments, the machine learning model may be updated using successive login requests. By updating the machine learning model in this manner, the machine learning model may be continuously trained to recognize current trends with login requests and system activity and be generally adaptive to such trends. Additionally, some embodiments may provide improved intelligence to agents tasked with monitoring login requests. Such an agent may be able to submit a search query including one or more login identification data and cross-reference the one or more login identification data to a database of information concerning prior login requests. The information may include information about whether the prior login requests were identified as unauthorized and may thereby provide the agent with valuable information for acting, or not acting, on a more recent login request.

Further aspects of the disclosure are discussed below. It should be understood that embodiments in this disclosure are exemplary only, and that other embodiments may include various combinations of features from other embodiments, as well as additional or fewer features.

In general, any process discussed in this disclosure that is understood to be computer-implementable, such as the processes illustrated in FIGS. 2, 3, 4, and 5, may be performed by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 6:
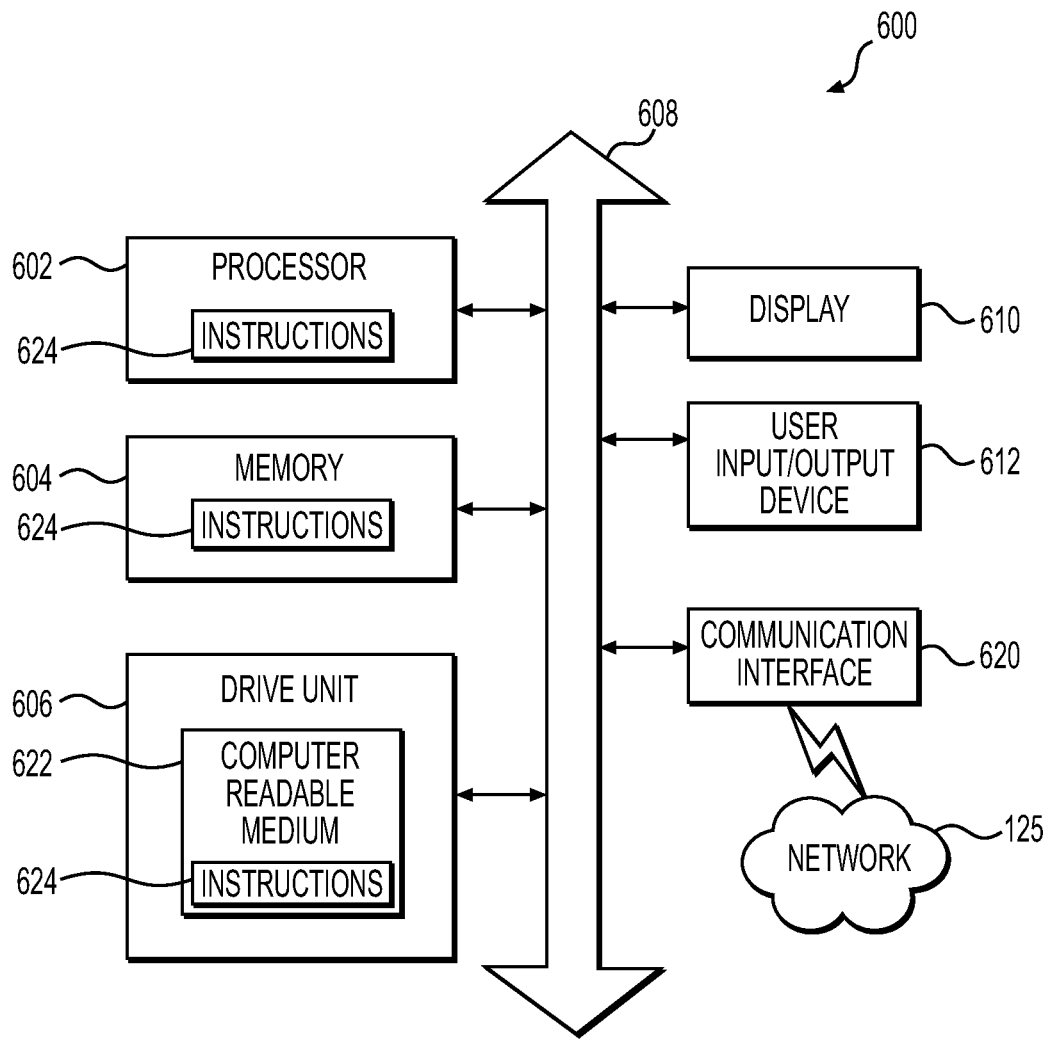
FIG. 6 depicts an example of a computing device, according to one or more embodiments.

FIG. 6 is a simplified functional block diagram of a computer system 600 that may be configured as a device for executing the processes of FIGS. 4 and 5, according to exemplary embodiments of the present disclosure. FIG. 6 is a simplified functional block diagram of a computer that may be configured to serve as the user device 105, the scoring system 110, the agent device 115, and/or the vendor device 120, according to exemplary embodiments of the present disclosure. In some embodiments, the user device 105, the scoring system 110, the agent device 115, and/or the vendor device 120 may include the components of FIG. 6 in addition to the specific components described herein previously. In various embodiments, any of the systems herein may be an assembly of hardware including, for example, a data communication interface 620 for packet data communication. The platform also may include a central processing unit ("CPU") 602, in the form of one or more processors, for executing program instructions. The platform may include an internal communication bus 608, and a storage unit 606 (such as ROM, HDD, SDD, etc.) that may store data on a computer readable medium 622, although the system 600 may receive programming and data via network communications including via network 125. The system 600 may also have a memory 604 (such as RAM) storing instructions 624 for executing techniques presented herein, although the instructions 624 may be stored temporarily or permanently within other modules of system 600 (e.g., processor 602 and/or computer readable medium 622). The system 600 also may include input and output ports 612 and/or a display 610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to identifying unauthorized login requests, it should be appreciated that the presently disclosed embodiments may be applicable to identifying login requests for any other purpose.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes depicted in FIGS. 4 and 5 and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method of identifying one or more unauthorized logins, the method comprising:
    receiving a login request from a user device, the login request including a plurality of login identification data;
    using a machine learning model, generating a score corresponding to the login request based on at least one of the plurality of login identification data, the machine learning model being trained to learn associations between the login identification data and scores based at least on (i) a set of prior login requests and (ii) a set of login classifications, each of the set of login classifications corresponding to at least one of the set of prior login requests;
    determining whether the score exceeds a predetermined score threshold;
    in response to a determination that the score exceeds the predetermined score threshold, rejecting the login request, tracking and recording activity corresponding to the plurality of login identification data, and prompting a user of the user device to submit a renewed login request;
    receiving a search query from an agent device, the search query including at least one of the plurality of login identification data;

matching, in response to the search query, one or more of the plurality of login identification data to each of the one or more of the set of prior login requests; and causing an indication of the one or more of the set of prior login requests to be displayed on the agent device, wherein the indication includes whether the one or more of the set of prior login requests were unauthorized and the one or more of the set of prior login requests caused to be displayed are the one or more of the set of prior login requests that have been matched to the one or more of the plurality of login identification data.

2. The method of claim 1, further comprising:
associating each of the one or more login identification data with the score; and
in response to receiving the search query, causing an indication of the score to be displayed on the agent device.

3. The method of claim 1, further comprising:
receiving a second login request from a second user device, the second login request including one or more second login identification data;
using the machine learning model, generating a second score corresponding to the second login request based on at least one of the one or more second login identification data;
determining whether the second score exceeds the predetermined score threshold; and
in response to a determination that the second score does not exceed the predetermined score threshold, processing the second login request and allowing the second user device to access a secure resource.

4. The method of claim 1, further comprising:
in response to the determination that the score exceeds the predetermined score threshold, rejecting the login request and prompting a user of the user device to complete a multi-factor authentication process.

5. The method of claim 4, further comprising:
in response to the determination that the score exceeds the predetermined score threshold, prompting the user of the user device to reset one or more login credentials.

6. The method of claim 1, further comprising:
in response to a determination that the score exceeds the predetermined score threshold, flagging the login request with an unauthorized classification.

7. The method of claim 6, wherein the machine learning model is further trained using the login request and the unauthorized classification.

8. The method of claim 1, wherein the one or more login identification data include at least one of a username, a password, a device ID, an ISP identifier, an IP address, or a user agent identifier.

9. The method of claim 1, further comprising:
in response to the determination that the score exceeds the predetermined score threshold, prompting, via an agent device, a classification to be assigned to the login request.

10. The method of claim 1, further comprising:
receiving, from a vendor device, a set of vendor data and a set of vendor classifications, each of the set of vendor classifications corresponding to a type of unauthorized activity;
wherein the machine learning model is further trained using (i) the set of vendor data and (ii) the set of vendor classifications.

11. The method of claim 1, wherein the machine learning model is further trained using timestamps corresponding to each of the set of login requests, the method further comprising:
generating, using the machine learning model, a projection of unauthorized logins over time; and
causing an indication of the projection to be displayed via an agent device.

12. The method of claim 1, wherein the predetermined score threshold is a first predetermined score threshold, the method further comprising:
determining whether the score exceeds a second predetermined score threshold, the second predetermined score threshold being greater than the first predetermined score threshold; and
in response to a determination that the score exceeds the second predetermined score threshold, collecting and storing data indicative of activity by the user device.

13. A computer-implemented method of training a machine learning model to identify one or more unauthorized logins, the method comprising:
training the machine learning model to learn associations between login requests and scores using at least (i) a set of prior login requests and (ii) a set of classifications, each of the set of classifications corresponding to at least one of the set of prior login requests;
receiving a login request from a user device, the login request including a plurality of login identification data;
generating, using the machine learning model, a score corresponding to the login request based on at least one of the plurality of login identification data;
displaying, on an agent device, an indication of the login request;
receiving a search query from the agent device, the search query including at least one of the plurality of login identification data;
matching, in response to the search query, one or more of the plurality of login identification data to each of the one or more of the set of prior login requests;
causing an indication of the one or more of the set of prior login requests to be displayed on the agent device, wherein the indication includes whether the one or more of the set of prior login requests were unauthorized and the one or more of the set of prior login requests caused to be displayed are the one or more of the set of prior login requests that have been matched to the one or more of the plurality of login identification data;
tracking and recording login requests corresponding to the user device; receiving, via the agent device, a classification of the login request; and
updating the machine learning model based on the classification of the login request and the tracked and recorded login requests.

14. The method of claim 13, further comprising:
receiving, from a vendor device, a set of vendor data and a set of vendor classifications, each of the set of vendor classifications corresponding to a type of unauthorized activity; and
training the machine learning model using (i) the set of vendor data and (ii) the set of vendor classifications.

15. The method of claim 13, wherein the set of prior login requests includes timestamps, each of the timestamps corresponding to at least one of the set of prior login requests, the method further comprising:

training the machine learning model using (i) the set of prior login requests, (ii) the set of classifications, and (iii) the timestamps to generate a projection of unauthorized logins over time.

16. The method of claim 13, wherein each prior login request in the set of prior login requests includes one or more login identification data, the one or more login identification data being at least one of a username, a password, a device ID, an ISP identifier, an IP address, or a user agent identifier.

17. The method of claim 13, further comprising:
receiving, from the agent device, prior identification data associated with a confirmed unauthorized login request and a confirmed unauthorized classification corresponding to the confirmed unauthorized login request; and
updating the machine learning model based on the identification data and the confirmed unauthorized classification.

18. The method of claim 17, wherein the prior identification data includes a device ID, the method further comprising:
updating the machine learning model based on the device ID and the confirmed unauthorized classification to associate the device ID with a score indicative of an unauthorized login.

19. A system for identifying one or more unauthorized logins, the system comprising:
an agent device;
one or more memories storing instructions and a machine learning model trained to learn associations between login requests and scores based at least on (i) a set of prior login requests and (ii) a set of classifications, each of the set of classifications corresponding to one of the set of prior login requests; and
one or more processors operatively connected to the one or more memories, the one or more processors configured to execute the instructions to:
receive a login request from a user device, the login request including a plurality of login identification data;
generate a score corresponding to the login request based on at least one of the plurality of login identification data, the score being indicative of a likelihood that the login request is unauthorized;
associate the plurality of login identification data with the score;
determine whether the score exceeds a predetermined score threshold;
in response to a determination that the score exceeds the predetermined score threshold, track and record login requests corresponding to the user device and cause the login request to be rejected and a user of the user device to be prompted to submit a renewed login request;
in response to a determination that the score does not exceed the predetermined score threshold, cause the login request to be processed and the user device to be allowed access to a secure resource;
receive a search query from the agent device, the search query including at least one of the one or more login identification data;
in response to receiving the search query, cause an indication of the score to be displayed on the agent device;
in response to receiving the search query, match one or more of the plurality of login identification data to one or more of the set of prior login requests; and
cause an indication of the one or more of the set of prior login requests to be displayed on the agent device, wherein the indication includes whether the one or more of the set of prior login requests were unauthorized and the one or more of the set of prior login requests caused to be displayed are the one or more of the set of prior login requests that have been matched to the one or more of the plurality of login identification data.

20. The method of claim 1, wherein the generated score corresponding to the login request is based on an application or web browser.

* * * * *